United States Patent
Han et al.

(10) Patent No.: US 8,676,443 B2
(45) Date of Patent: Mar. 18, 2014

(54) SYSTEM AND METHOD FOR CONTROLLING INTER-VEHICLE DISTANCE USING SIDE AND REAR SENSOR

(75) Inventors: Sang Wook Han, Seoul (KR); Joon Sang Jo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 44 days.

(21) Appl. No.: 13/421,149

(22) Filed: Mar. 15, 2012

(65) Prior Publication Data

US 2013/0166150 A1 Jun. 27, 2013

(30) Foreign Application Priority Data

Dec. 26, 2011 (KR) .................. 10-2011-0142116

(51) Int. Cl.
*G06F 19/00* (2011.01)

(52) U.S. Cl.
USPC .................. 701/42; 701/41; 701/70; 701/93; 701/96; 701/117; 340/435; 340/436; 340/438; 340/903; 340/905; 180/167; 180/168; 180/169; 180/170; 180/178

(58) Field of Classification Search
USPC ............... 701/41, 70, 93, 96, 117, 300, 301; 340/409, 435, 436, 438, 903, 905, 942; 180/167, 168, 169, 170, 178, 179; 356/3.14, 4.02, 5.01; 342/70, 71, 72, 342/455; 348/118, 169; 318/587; 250/201.6; 396/121; 123/352; 382/106
See application file for complete search history.

(56) References Cited

U.S. PATENT DOCUMENTS

| | | | |
|---|---|---|---|
| 5,675,518 A * | 10/1997 | Kuroda et al. | 702/97 |
| 5,777,451 A * | 7/1998 | Kobayashi et al. | 318/587 |
| 5,874,904 A * | 2/1999 | Hirabayashi et al. | 340/903 |
| 6,067,147 A * | 5/2000 | Hirabayashi et al. | 356/3.14 |
| 6,114,951 A * | 9/2000 | Kinoshita et al. | 340/436 |
| 6,246,932 B1 * | 6/2001 | Kageyama et al. | 701/24 |
| 6,249,232 B1 * | 6/2001 | Tamura et al. | 340/902 |
| 6,353,785 B1 * | 3/2002 | Shuman et al. | 701/48 |
| 6,577,937 B1 * | 6/2003 | Shuman et al. | 701/48 |
| 6,675,081 B2 * | 1/2004 | Shuman et al. | 701/48 |
| 2003/0065432 A1 * | 4/2003 | Shuman et al. | 701/48 |
| 2008/0133066 A1 * | 6/2008 | Takenaka | 701/1 |
| 2010/0211235 A1 * | 8/2010 | Taguchi et al. | 701/1 |

FOREIGN PATENT DOCUMENTS

| | | |
|---|---|---|
| JP | 04019274 A | 1/1992 |
| JP | 08091159 A | 4/1996 |
| JP | 09-221052 | 8/1997 |

(Continued)

*Primary Examiner* — McDieunel Marc
(74) *Attorney, Agent, or Firm* — Edwards Wildman Palmer LLP; Peter F. Corless

(57) ABSTRACT

A system and method are provided for controlling inter-vehicle distance. The system includes a front sensor, a side and rear sensor, an inter-vehicle distance controlling unit, and a steering controlling unit. The front sensor obtains information relating to a preceding vehicle. The side and rear sensor obtains information relating to vehicles in right and left lanes. The inter-vehicle distance controlling unit determines an avoidance direction for a lane change from data detected by the side and rear sensor when it is determined from data detected by the front sensor that a front end collision is unavoidable through just brake input. The steering controlling unit receives information relating to the avoidance direction determined by the inter-vehicle distance controlling unit and applies a steering force to a steering device to guide a driver to a lane in the determined avoidance direction.

17 Claims, 5 Drawing Sheets

(56) References Cited

FOREIGN PATENT DOCUMENTS

| JP | 2005088717 A | 4/2005 |
| JP | 2007-083818 A | 4/2007 |
| KR | 10-0134837 | 1/1998 |
| KR | 10-0696392 | 3/2007 |

\* cited by examiner

| DIVISION | DANGEROUS SITUATION OF LEFT LANE | |
|---|---|---|
| | STEERING APPARATUS | CLUSTER |
| CRASH AVOIDANCE CONTROL | ↻ STEERING-ASSISTANT FORCE<br>↺ STEERING REACTION FORCE | ○ WARN ABOUT DANGEROUS SITUATION(LAMP,LCD)<br>○ DISPLAY AVOIDANCE DIRECTION<br>⬅ ➡<br>FLICKERING |
| | ↺ STEERING-ASSISTANT FORCE<br>↻ STEERING REACTION FORCE | DANGEROUS SITUATION<br>⬅ ➡<br>FLICKERING |

FIG. 4

SYSTEM AND METHOD FOR CONTROLLING INTER-VEHICLE DISTANCE USING SIDE AND REAR SENSOR

CROSS-REFERENCE TO RELATED APPLICATION

This application claims under 35 U.S.C. §119(a) the benefit of Korean Patent Application No. 10-2011-0142116 filed Dec. 26, 2011, the entire contents of which are incorporated herein by reference.

BACKGROUND (a) Technical Field

The present invention relates to a system and method for controlling inter-vehicle distance using a side and rear sensor. More particularly, it relates to a system and method to for controlling an inter-vehicle distance, which can allow a subject vehicle to avoid a front end collision with a preceding vehicle by guiding driver's steering input in a safe direction.

(b) Background Art

Generally, inter-vehicle distance control refers to a technology for automatically controlling a power system and a brake system of a subject vehicle (i.e., vehicle equipped with an inter-vehicle distance controlling system) to measure a distance between the subject vehicle and a preceding vehicle and aid the driver in maintaining a safety distance from the preceding vehicle.

Inter-vehicle distance secures a safety distance from a preceding vehicle by reducing the speed of the subject vehicle through control of the power train system and the braking system when a distance from the preceding vehicle falls within a predetermined safety distance.

Typically, in a vehicle equipped with an inter-vehicle distance controlling system, when there is no preceding vehicle, a vehicle cruises at a speed set by a driver. On the other hand, when there is a preceding vehicle, the vehicle maintains the same speed as the preceding vehicle while maintaining the distance from the preceding vehicle, and when the preceding vehicle disappears, the vehicle is again accelerated to a set speed and cruises at a constant speed.

When a driver sets a speed, the inter-vehicle distance controlling system allows a vehicle to cruise at the set speed without additional driver manipulation. Accordingly, the inter-vehicle distance controlling system can significantly reduce the manipulation of an accelerator on expressways or car-only roads, and can reduce driver's fatigue during long-distance driving, thereby increasing the driving convenience.

In the inter-vehicle distance controlling system, a radar sensor is often used to obtain information on the presence or absence of a preceding vehicle, and a distance (relative distance) and a relative velocity between a subject vehicle and a preceding vehicle.

As examples of prior art related to an inter-vehicle distance controlling system, there are Korean Patent Nos. 10-1092721 and 10-0916259 and Korean Patent Application Publication Nos. 10-2010-0060535 and 10-2009-0062527 which are hereby incorporated by reference in their entirety.

Due to a limitation (i.e., deceleration: 0.2 g to 0.3 g, g: gravity acceleration) in the deceleration of a vehicle equipped with an inter-vehicle distance controlling system, in emergent situations such as cases where a preceding vehicle is rapidly decelerated, (e.g., when a vehicle of a side lane suddenly cuts in, etc.), the conventional inter-vehicle distance controlling systems are not sufficient to avoid a collision with the preceding car.

In such situations, a typical inter-vehicle distance controlling system generally warns a driver and automatically cancels its operation. In this case, the driver must quickly take over the vehicle and directly step on a brake pedal to control the speed of a vehicle or swerve the vehicle to avoid a collision. Since not all drivers have the same level of reflexes to such situations, the driving safety cannot always be ensured in the conventional systems.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for controlling an inter-vehicle distance, which can allow a subject vehicle to avoid a front collision with a preceding vehicle or a stopped vehicle by automatically guiding driver's steering input in a safe direction.

In one aspect, the present invention provides a system for controlling inter-vehicle distance, including: a front sensor (first sensor) configured to obtain information relating to a preceding vehicle; a side sensor and a rear sensor (a second and third sensor) configured to obtain information relating to vehicles in right and left lanes relative to a subject vehicle; an inter-vehicle distance controlling unit configured to determine an avoidance direction for a lane change from data detected by the side and rear sensors when it is determined from data detected by the front sensor that a front crash is unavoidable with a driver's brake input; and a steering controlling unit configured to receive information relating to the avoidance direction determined by the inter-vehicle distance controlling unit and assist a steering wheel manipulation force of a driver to guide to the subject vehicle in the avoidance direction via a driver's steering input.

In another aspect, the present invention provides a method for controlling an inter-vehicle distance, including: determining, by an inter-vehicle distance unit, whether a front crash is avoidable by a driver's brake input from data detected by a front sensor for obtaining information on a preceding vehicle during operation of inter-vehicle distance control; determining an avoidance direction for a lane change from data detected by a side and rear sensor that obtain information on vehicles in right and left lanes relative to the subject vehicle when it is determined that the front crash is unavoidable by the driver's brake input; and receiving, by a steering controlling unit, information on the avoidance direction determined by the inter-vehicle distance controlling unit and assisting a driver's steering wheel manipulation force to guide the lane change to the avoidance direction by a driver's steering input.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 4 is a view illustrating a steering assisting state and a cluster display state in a process of controlling an inter-vehicle distance according to an exemplary embodiment of the present invention.

Figure 1:
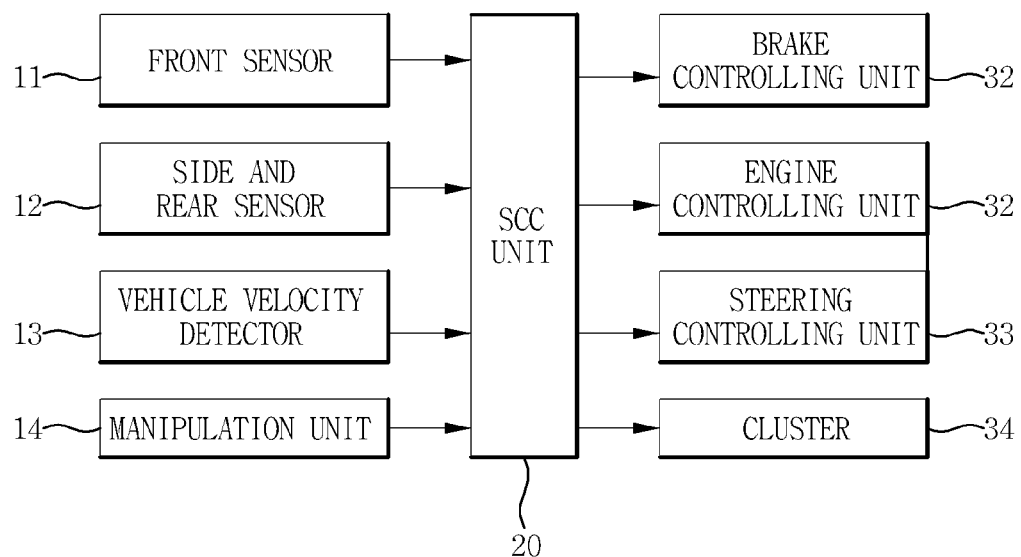
FIG. 1 is a view illustrating a structure of an inter-vehicle distance controlling system according to an exemplary embodiment of the present invention.

Reference numerals set forth in the Drawings includes reference to the following elements as further discussed below:

| | |
|---|---|
| 1: | subject vehicle |
| 2: | side-lane vehicle (following vehicle) |
| 3: | lane |
| 4: | center lane |
| 11: | front sensor |
| 12: | side and rear sensor |
| 13: | vehicle speed detector |
| 14: | manipulation unit |
| 20: | inter-vehicle distance controlling unit |
| 31: | brake controlling unit |
| 32: | engine controlling unit |
| 33: | steering controlling unit |
| 34: | cluster |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The illustrative embodiment of the present invention provides a system and method for controlling an inter-vehicle distance, which aides in avoiding front end collisions by determining whether a front end collision can be avoid only through a brake input from a driver during inter-vehicle distance control, and checking information on adjacent lanes collected by a side and rear sensor and then inducing a driver to change a lane in a safe direction when the front crash cannot be avoided through only brake input.

The method of controlling the inter-vehicle distance may include determining side and rear danger from vehicles of adjacent lanes collected by a side and rear sensor, i.e., determining the risk degree and the presence or absence of dangerous vehicles approaching from right and left lanes of a subject vehicle. Thus, a subsequent accident can be prevented when the subject vehicle changes its lane to avoid the front end collision.

Figure 2:
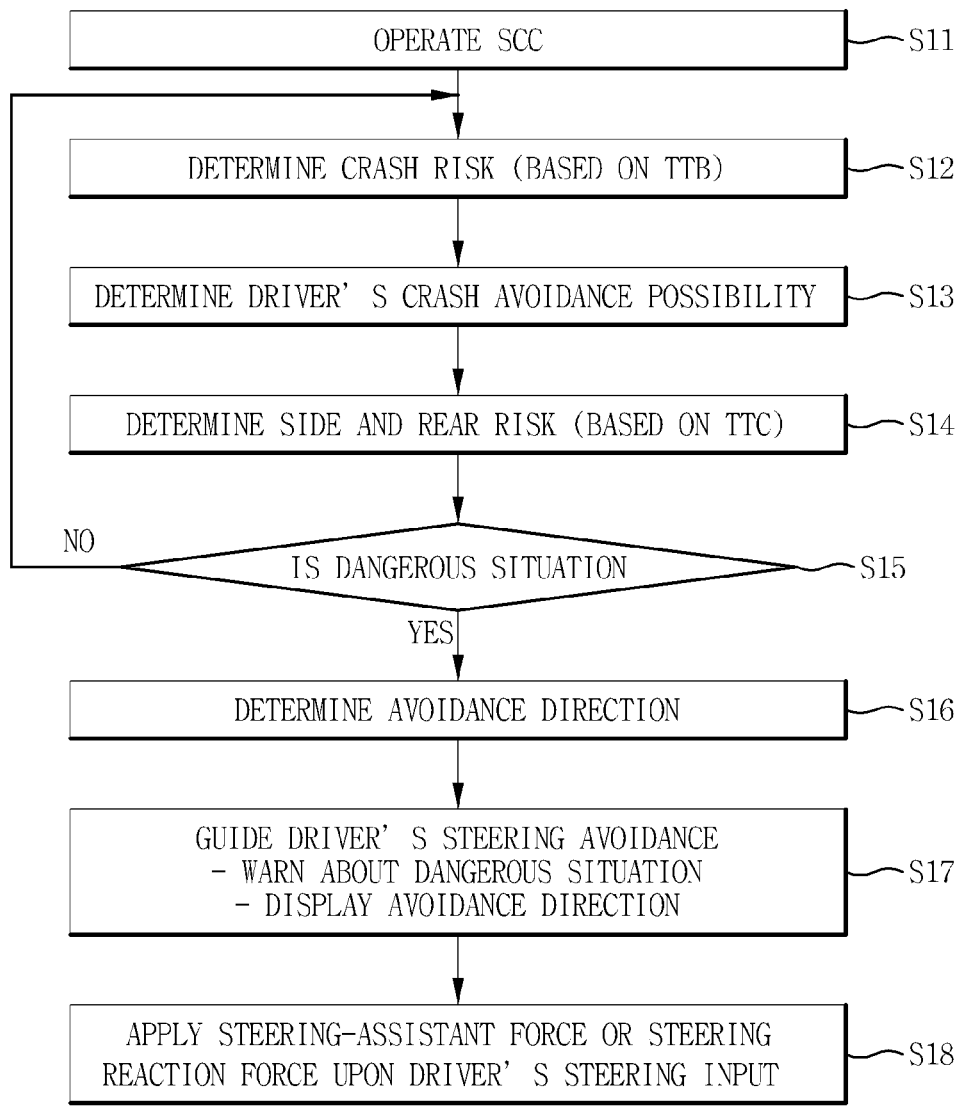
FIG. 2 is a flowchart illustrating a method for controlling an inter-vehicle distance to according to an exemplary embodiment of the present invention.

FIG. 1 is a view illustrating a structure of an inter-vehicle distance controlling system according to an embodiment of the present invention. FIG. 2 is a flowchart illustrating a method for controlling an inter-vehicle distance according to an embodiment of the present invention.

Figure 3:
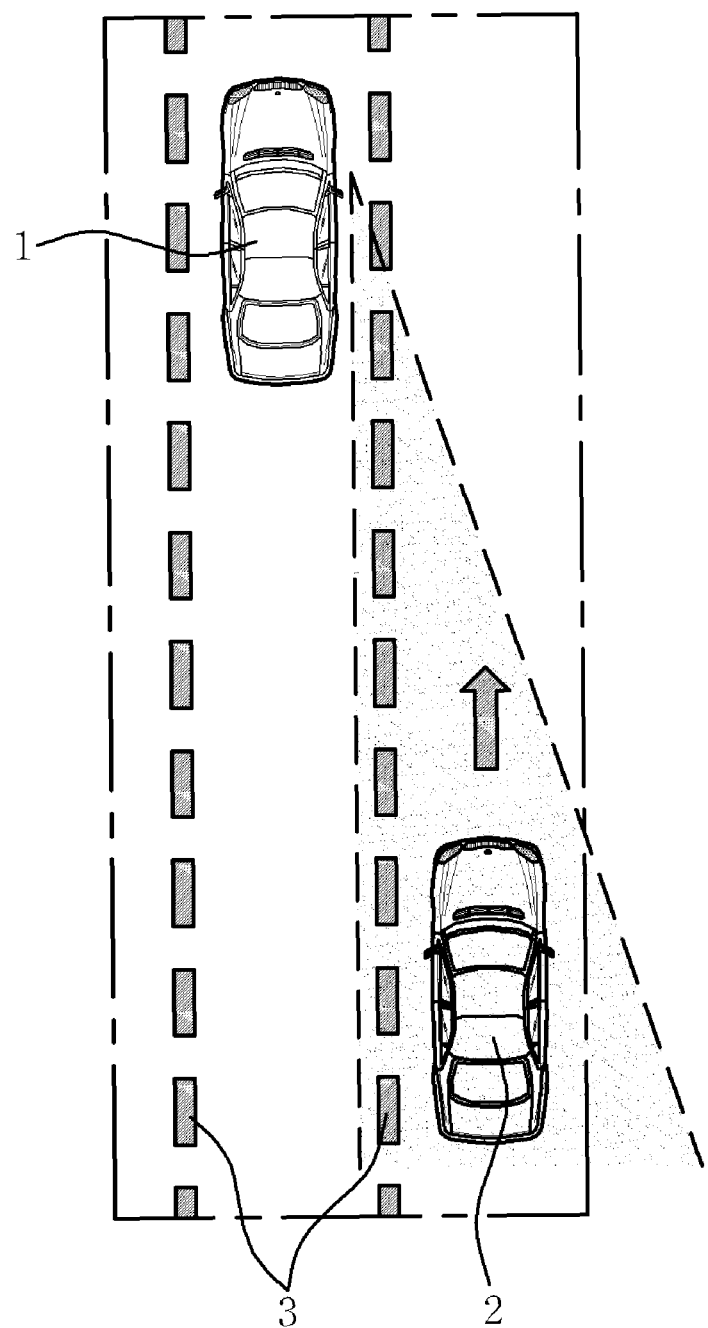
FIG. 3 is a view illustrating collection of information on side and rear vehicles by a side and rear sensor in an inter-vehicle distance controlling system according to an exemplary embodiment of the present invention.
Figure 5:
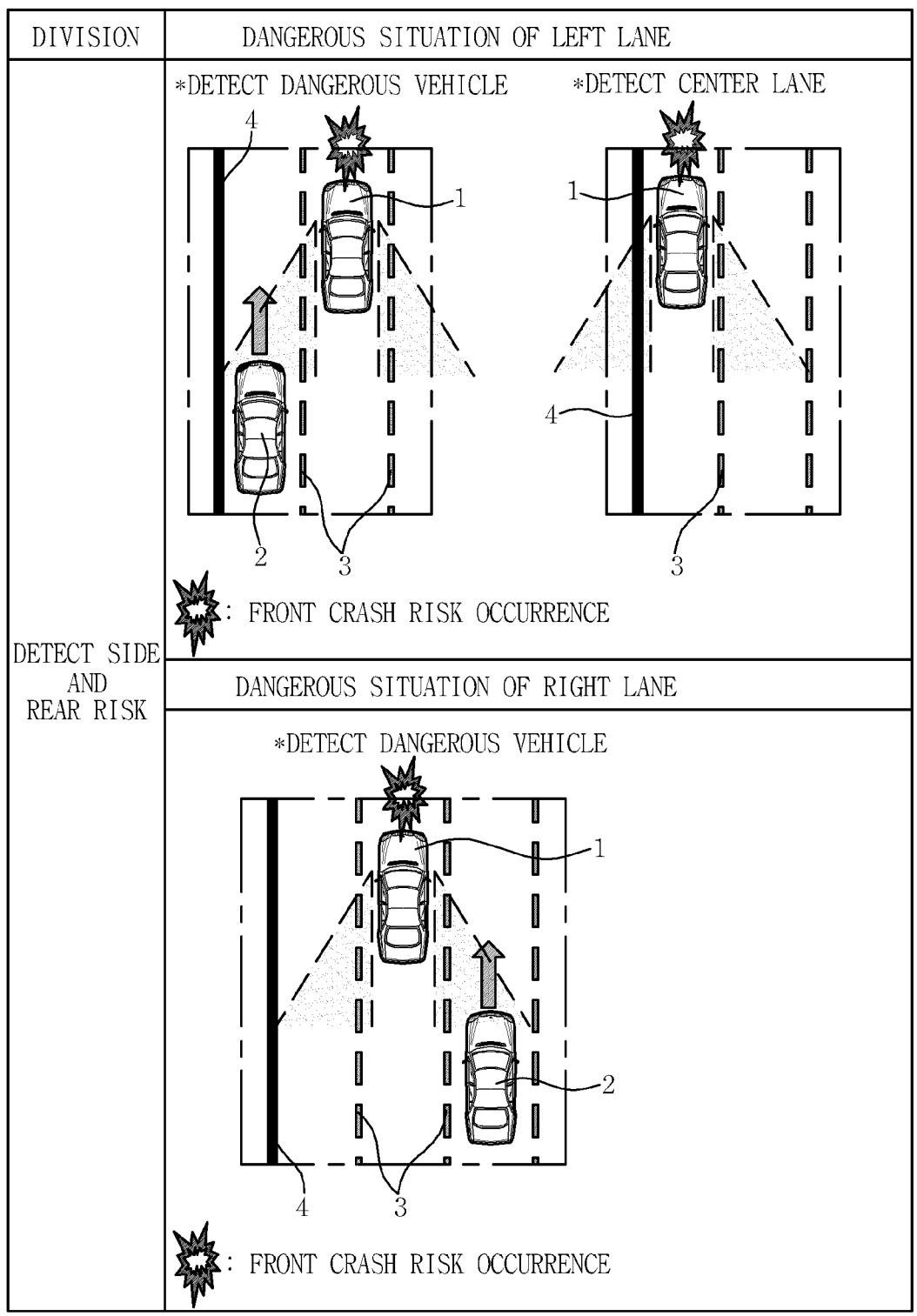
FIG. 5 is a view illustrating dangerous situations of a left lane and a right lane in a process of controlling an inter-vehicle distance according to an exemplary embodiment of the present invention.

FIG. 3 is a view illustrating collection of information on side and rear vehicles, i.e., vehicles of adjacent lanes by a side and rear sensor in an inter-vehicle distance controlling system according to an exemplary embodiment of the present invention FIG. 4 is a view illustrating a steering assisting and restraining state and a cluster display state in a process of controlling an inter-vehicle distance according to an embodiment of the present invention. FIG. 5 is a view illustrating dangerous situations of a left lane and a right lane in a process of controlling an inter-vehicle distance according to an embodiment of the present invention.

As shown in FIG. 1, a system (hereinafter, referred to as a Smart Cruise Control (SCC) system) for controlling an inter-vehicle distance may typically include a front sensor 11, a vehicle speed detector 13, a manipulation unit 14, an inter-vehicle distance controlling unit (hereinafter, referred to as a Smart Cruise Control (SCC) unit) 20, a brake controlling unit 31, and an engine controlling unit 32. The front sensor 11 may sense a preceding vehicle that is driving in the same lane, and may include a typical radar sensor.

In the above configuration, a driver may perform on/off operation of the SCC system, speed setting, and inter-vehicle distance setting. Thereafter, the SCC unit 20 may perform typical control between vehicles based on information collected by the front sensor 11 and the vehicle speed detector 13. In this case, when a driver sets the vehicle speed and the inter-vehicle distance by manipulating the manipulation unit 14, the vehicle speed and distance information may be displayed on a cluster 34.

The SCC unit 20 may receive data detected by the front sensor 11 for obtaining information on a preceding vehicle and the vehicle speed detector 13 for detecting the vehicle speed to obtain information on the presence or absence of the preceding vehicle, and the relative distance, relative velocity, and relative deceleration between the subject vehicle and the preceding vehicle, and may perform control in association with the brake controlling unit 31 and the engine controlling unit 32 using the obtained information to control the brake system (e.g., the hydraulic brake system) and the power train system (e.g., the engine).

During SCC, the brake controlling unit (e.g., a control unit for Electronic Stability Control (ESC)) 31 may control a braking force of a vehicle through hydraulic control (e.g., solenoid valve control) of the hydraulic braking system while performing calculation and distribution of a braking torque required for braking, and the engine controlling unit 32 may perform engine torque control.

Accordingly, when there is no preceding vehicle during SCC, a vehicle may cruise at a speed set using the manipulation unit 14 by a driver. On the other hand, when there is a preceding vehicle, the vehicle may cruise at the same speed as the preceding vehicle while maintaining a preset distance from the preceding vehicle, and when the preceding vehicle disappears, the vehicle may be again accelerated to a set speed and may cruise at a constant speed.

While the SCC unit 20 is performing typical SCC in the SCC system, the SCC unit 20 may continually determine the crash risk (e.g., front end crash risk) with a preceding vehicle and the crash avoidance possibilities by driver's brake input, based on the data detected by the front sensor 11 and the vehicle speed detector 13. A detailed description thereof will be made later.

The SCC system may further include a side and rear sensor 12 for collecting information on a vehicle 2 on a side lane as shown in FIG. 3. The information on the side-lane vehicle 2 collected by the side and rear sensor 12 may be used to determine the side and rear risks, respectively, e.g., the presence or absence and risk of a following vehicle approaching from a right or left side lane of a subject vehicle 1.

The side and rear sensors 12 may be disposed on right and left portions, e.g., right and left mirrors of the vehicle 1 (see FIGS. 3 and 5). Particularly, the side and rear sensor 12 may include a camera that can collect image information from which a general lane 3 and a center lane 4 can be read out.

A typical Blind Spot Detection (BSD) sensor, i.e., an ultrasonic sensor or a radar sensor that is used to monitor a side blind spot of a vehicle may monitor only the blind spot for a driver, but cannot distinguish between the general lane 3 and the center lane 4. However, when the side and rear sensors 12 including a camera are used, the general lane 3 and the center lane 4 can be identified from image data obtained the camera 1 (see FIG. 5). Also, the side and rear sensor 12 may monitor a relatively distant detection region to obtain the distance between the subject vehicle 1 and the following vehicle 2 driving in a side lane at the side and rear of the subject vehicle 1, and the relative velocity and deceleration between the vehicles 1 and 2.

Thus, during the operation of SCC, the SCC unit 20 may obtain information on a vehicle of a side lane from the image data obtained by the side and rear sensor 12, and may determine the presence or absence and the risk of the following vehicle approaching from the right or left lane (side lane) of the subject vehicle 1.

During the operation of SCC, the SCC unit 20 may always perform the process of determining a front end collision risk based on the data detected by the front sensor 11 and the vehicle speed detector 13, the process of determining crash avoidance possibilities, and the process of determining a side and rear risk based on the data detected by the side and rear sensor 12.

Also, when it is determined that a front end crash cannot be avoided only by the driver's brake input during the above process, the operation of SCC may be cancelled, and the avoidance direction may be determined according to a determination result of the current side and rear risk.

In this case, the SCC unit 20 may determine whether a lane (e.g., left lane) just adjacent to the lane in which the subject vehicle 1 is currently driving is the center lane 4 from the image data of the side and rear sensor 12, and may determine a safe direction in which there is no crash risk with the following vehicle 2 while not going beyond the center lane 4, as an avoidance direction.

Hereinafter, the avoidance direction means a direction of one of the right and left lanes of the subject vehicle 1, which does not correspond to a dangerous situational condition (see Table 1 below) in the process of determining of the side and rear risk. In other words, the avoidance direction is a safe lane direction in which a crash with a vehicle approaching from the rear side will not occur when the vehicle 1 changes lanes (e.g., lane 3).

In the determining of the avoidance direction, the SCC unit 20 may determine one of the right and left lanes in which there is no crash risk, as the avoidance direction. In this case, when the just adjacent lane is determined to be the center lane 4 (see FIG. 5), the direction of the center lane 4 may be excluded from the avoidance direction because the lane change (change into the left lane) into the center lane 4 has to be inhibited.

In this case, when it is determined that there is no crash risk with a following vehicle in the opposite lane to the center lane, the direction into the opposite lane may be determined as the avoidance direction. Additionally, if the avoidance direction is determined, then a driver may be immediately warned of a dangerous situation through the cluster 34, and the avoidance direction may be displayed on the cluster 34 as shown in FIG. 4.

Here, examples of warning means for warning about the dangerous situation may include warning lamps (e.g., LED warning lamps separately provided in the cluster 34) built in the cluster 34 and turned on or flickered by the SCC unit 20 and/or displays such as LCD built in the cluster 34 to display the dangerous situation, but the present invention is not limited thereto as long as it is a warning issue means for warning a driver of a dangerous situation is implemented.

Also, as a directional indicating means for displaying the avoidance direction, a turn signal lamp may be provided in the cluster 34. In this case, the SCC unit 20 may be configured to control the flickering of the turn signal lamp. As other directional indication means, a display such as LCD and a voice output means for outputting and indicating the avoidance direction may be provided in the cluster 34. When lamps or displays are provided in the cluster 34 as a warning means or a directional indicating means, the SCC unit 20 may deliver an operation order to a cluster controlling unit, and the cluster controlling unit may operate the lamps and the displays accordingly.

The warning means for warning the driver of a dangerous situation and the directional indicating means for displaying the avoidance direction may become a component for warning the driver that a front end collision is an unavoidable through electrical control means and thus notify a driver to perform steering input in the avoidance direction that is displayed.

In addition, a steering apparatus for inducing a driver's steering input in a safe direction (e.g., the avoidance direction determined as above) may be provided. When the avoidance direction is determined which will prevent a front end crash by inducing the lane change into a safe direction and prevent a subsequent crash upon lane change, the steering control may be performed under cooperative control of the SCC unit 20 and the steering controlling unit 33 to allow the manipulation of a steering wheel to become easy when a driver tries to manipulate the steering wheel in the avoidance direction and allow the manipulation of the steering wheel to become hard when the driver tries to manipulate the steering wheel in the opposite direction of the avoidance direction.

Thus, a driver may be induced to change lanes in a safe direction by allowing the driver to easily manipulate the steering wheel in the avoidance direction. When changing the lane into a side lane to avoid a front end collision, a subsequent collision with the side-lane vehicle 2 can be prevented by making it difficult for a driver to manipulate the steering wheel in a dangerous direction and preventing the driver from changing lanes in the dangerous direction.

For this, the SCC unit 20 may deliver information on the avoidance direction determined by the process of determining the side and rear risk (e.g., determining a right and left lane risk of the subject vehicle) and the process of determining the avoidance direction to the steering controlling unit 33. More specifically, the steering controlling unit 33 may control the operation of the steering apparatus such that a steering-assistant force or a steering reaction force is applied to a steering shaft, based on the avoidance direction information delivered from the SCC control unit 20 and the driver's steering wheel manipulation state a driver may easily determine the best avoidance direction.

As well-known, modern vehicles are being equipped with a hydraulic or motor-driven power-assistant steering apparatus that assists a steering force based on a driver's steering intention. The hydraulic or motor-driven power-assistant steering apparatus may include a steering torque sensor for detecting a steering torque (e.g., a force for manipulating a steering wheel by a driver) and a steering angle sensor for detecting the angle at which the steering wheel is rotated.

In the power-assistant steering apparatus, the manipulation of the steering wheel may become difficult during high-speed driving and may become easy during low-speed driving or parking by varying the steering boosting according to the vehicle speed, and thus the steering convenience and stability can be secured.

In a hydraulic power steering, the steering boosting may be controlled by varying a hydraulic pressure applied to a hydraulic cylinder. In a Motor-Driven Power Steering (MDPS), the steering boosting may be controlled by controlling a motor torque. Hereinafter, a motor-driven power steering (hereinafter, referred to as MDPS) will be described as an example.

In MDPS, the steering controlling unit 33 may control the driving of a motor to apply a steering-assistant force or a steering reaction force to a steering shaft upon driver's steering input. If a manipulation direction of the steering wheel detected by the steering angle sensor and an avoidance direction are equal to each other, the steering-assistant force may be applied. On the other hand, if the manipulation direction and the avoidance direction are opposite to each other, the steering reaction force may be applied to restrain the driver's steering manipulation (steering restraint).

Upon driver's steering input in the avoidance direction, a weak steering-assistant force by a motor may be applied to assist a driver to perform steering manipulation in a safe direction. On the other hand, upon driver's steering input in the opposite direction, i.e., dangerous direction, a weak steering reaction force by the motor may be applied to restrain the driver's steering manipulation.

In addition, the SCC unit 20 may determine through the above processes that both right and left directions are dangerous. In this case, the steering controlling unit 33 may receive a both-direction risk signal, and may apply a weak steering reaction force in both directions upon driver's steering input to restrain the steering manipulation in both directions.

Thus, the system including the front sensor 11, the side and rear sensor 12, the vehicle speed detector 13, the manipulation unit 14, the SCC unit 20, the brake controlling unit 31, the engine controlling unit 32, the steering controlling unit (steering apparatus) 33, and the cluster 34 has been described as above. Hereinafter, a SCC method using the above system will be described in detail with reference to FIG. 2.

First, when a driver performs SCC through turn-on of the SCC system, speed setting, and inter-vehicle distance setting (S11), the SCC unit 20 may continually perform collision risk analysis with a preceding vehicle (S12), determine driver crash avoidance possibilities (S13), and determine a side and rear crash risks (S14).

In the determining of the crash risk (S12), the SCC unit 20 may receive data detected by the front sensor (e.g., radar sensor) 11 and the vehicle speed detector 13 to obtain information on a preceding vehicle (e.g., in front of the subject vehicle, including stopped vehicles), i.e., a relative distance and a relative velocity data between the subject vehicle and the preceding vehicle, and may calculate a crash risk using the data.

In this case, the crash risk may be a value in accordance with the relative distance and the relative velocity. When the crash risk is compared with a predetermined reference value, the crash risk may serve to determine whether a crash with a preceding vehicle can be avoided only with driver's brake input.

The crash risk may become Time-to-Brake (TTB), i.e., a remaining time until the maximum braking (e.g., −1 g) to avoid a crash with a preceding vehicle. In this case, smaller TTB means a higher crash dangerous situation (i.e., a low crash avoidance situation)

In an embodiment of the present invention, a table defining TTB value (time value) according to the relative distance and the relative velocity may be used. The TTB table may be obtained and then established by a previous test. The TTB value may be set as time values according to the relative distance and the relative velocity. The TTB value determined from the TTB table by the current relative distance and velocity may be used to determine the crash avoidance possibility of a driver.

In the determining of the crash avoidance possibility of a driver (S13), it is determined from the crash risk calculated from the relative distance and velocity data, i.e., the TTB value, whether a crash can be avoided through maximum braking in the current state of the subject vehicle. When the TTB value falls within a reference value (e.g., a predetermined time value), it is determined to be a dangerous situation in which a crash is unavoidable through only brake input by the driver. In some embodiments of the present invention, the relative distance, the relative velocity, and the TTB value according thereto may be substituted with a relative deceleration and a TTB value according thereto.

In the determining side and rear crash risks (S14), information relating to a to dangerous vehicle approaching from the right and left lanes 3 of the subject vehicle, i.e., information on the vehicle 2 in the right or left lane may be obtained from the data detected by the side and rear sensor 12 and the vehicle speed detector 13, and then the side and rear collision crash risks may be determined therefrom.

In this case, the side and rear crash risk may be calculated from the information relating to the vehicle in the right and left lanes, i.e., the relative distance and velocity data with respect to the side-lane vehicle 2, and then may be compared with the reference value.

The side and rear crash risk may be a value according to the relative distance and the relative velocity. When the side and rear crash risk is compared with the predetermined reference value, the side and rear risk may serve to determine whether a crash with a side-lane vehicle 2 would occur when the current lane of the subject vehicle is changed into the right or left lane.

The side and rear crash risk may become Time-to-Collision (TTC) that means a remaining time from current any instance in time and a crash. In this case, smaller TTC means a higher side and rear dangerous situation (e.g., a highly collidable situation).

TABLE 1

| | | Relative Distance [m] | | | | | | | | | | | | | | |
|---|---|---|---|---|---|---|---|---|---|---|---|---|---|---|---|---|
| | | 0 | 5 | 10 | 15 | 20 | 25 | 30 | 35 | 40 | 45 | 50 | 55 | 60 | 65 | 70 |
| Relative | 0 | | – | – | – | – | – | – | – | – | – | – | – | – | – | – |
| Velocity | 5 | 0 | 3.6 | 7.2 | 10.8 | 14.4 | 18 | 21.6 | 25.2 | 28.8 | 32.4 | 36 | 39.6 | 43.2 | 46.8 | 50.4 |
| [kph] | 10 | 0 | 1.8 | 3.6 | 5.4 | 7.2 | 9 | 10.8 | 12.6 | 14.4 | 16.2 | 18 | 19.8 | 21.6 | 23.4 | 25.2 |
| | 15 | 0 | 1.2 | 2.4 | 3.6 | 4.8 | 6 | 7.2 | 8.4 | 9.6 | 10.8 | 12 | 013.2 | 14.4 | 15.6 | 16.8 |
| | 20 | 0 | 0.9 | 1.8 | 2.7 | 3.6 | 4.5 | 5.4 | 6.3 | 7.2 | 8.1 | 9 | 9.9 | 10.8 | 11.7 | 12.6 |
| | 25 | 0 | 0.72 | 1.44 | 2.16 | 2.88 | 3.6 | 4.32 | 5.04 | 5.76 | 6.48 | 7.2 | 7.92 | 8.64 | 9.36 | 10.08 |
| | 30 | 0 | 0.6 | 1.2 | 1.8 | 2.4 | 3 | 3.6 | 4.2 | 4.8 | 5.4 | 6 | 6.6 | 7.2 | 7.8 | 8.4 |

 Dangerous Situation Condition (TTC less than 3 sec) e

The TTC table may be obtained and set by a previous test. As shown in Table 1, the TTC values may be set as time values according to the relative distance and the relative velocity. The TTC value determined from the TTC table by the current relative distance and velocity may be used to determine the right or left avoidance direction. The relative to distance, the relative velocity, and the TTB value according thereto may be substituted with a relative deceleration and a TTB value according thereto.

In the determining of the crash avoidance possibility of a driver, when it is determined that a front end collision situation cannot be avoided only through brake input by the driver, the SCC operation may be cancelled, and the avoidance direction may be determined according to the current side and rear risk factors (S15 and S16).

In the determining of the avoidance direction (S16), the center lane 4 may be determined by analyzing the lanes from camera image data. Also, one of the right and left lane directions may be determined as the avoidance direction by the side and rear risk and the result of determining of the center lane.

In this case, the center lane direction may be preferentially excluded from the avoidance direction, and a direction in which the side and rear risk falls within the reference value, for example, the TTC value falls within about 3 seconds as shown in Table 1 may be excluded from the avoidance direction.

As a result, a direction in which the TTC value exceeds 3 seconds may be determined as the avoidance direction. If the TTC values exceed 3 seconds in both directions, that is, both directions are avoidable directions, a direction in which the TTC value is greater may be determined as the avoidance direction.

After the determining of the avoidance direction, a driver is guided to a steering avoidance operation (S17), e.g., warning the driver of a dangerous situation through the cluster 34, and the avoidance direction is displayed on the cluster 34 indicating to the driver which lane the subject vehicle should be changed to in order to avoid a front end collision and any subsequent collision.

As described above, under the cooperative control of the SCC unit 20 and the steering controlling unit 33, when a driver manipulates the steering wheel in the avoidance direction, a steering-assistant force may be applied to make manipulation easy in the appropriate direction. However, when the driver manipulates the steering wheel in the opposite direction, i.e., dangerous direction, a steering reaction force may be applied to restrain the steering manipulation.

In the determining of the avoidance direction, when both directions are determined to be dangerous directions in which the TTC values fall within 3 seconds, steering reaction forces may be applied to restrain the steering manipulation in both directions.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Thus, according to an SCC system and method of the exemplary embodiment of the present invention, a front crash risk and a subsequent accident upon lane change can be effectively prevented, by determining whether a front end collision is avoidable via brake input only, and analyzing and monitoring a side lane vehicle information collected by side and rear sensors when the front end collision is unavoidable and then guiding driver's steering input and lane change in a safe direction.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling inter-vehicle distance, comprising:
a first sensor configured to obtain information relating to a preceding vehicle relative to a subject vehicle;

at least one second sensor configured to obtain information relating to one or more vehicles in right and left lanes relative to the subject vehicle;

an inter-vehicle distance controller configured to determine an avoidance direction for a lane change from data detected by the at least one second sensor when it is determined from data detected by the first sensor that an end collision is unavoidable via only brake input; and a steering controller configured to receive information relating to the avoidance direction determined by the inter-vehicle distance controlling unit and apply a steering force to a steering device to guide a driver to a lane in the determined avoidance direction.

2. The system of claim 1, wherein first sensor is disposed in a front portion of the subject vehicle and the at least one second sensor is disposed on a side portion of the subject vehicle and the inter-vehicle distance controller is configured to determine a crash risk with the preceding vehicle based on the data detected by the first sensor and determines whether the collision is avoidable through only brake input.

3. The system of claim 1, wherein the inter-vehicle distance controller determines a side and rear risk by the vehicles in the right and left lanes based on the data detected by the at least one second sensor, and determines the avoidance direction for the lane change from the side and rear risk.

4. The system of claim 1, wherein the inter-vehicle distance controller warns the driver of a dangerous situation through a warning unit while cancelling control of an inter-vehicle distance controlling operation when it is determined that a front end collision is unavoidable via only brake input, and indicates the avoidance direction to the driver by a directional indicating unit.

5. The system of claim 1, wherein the at least one second sensor comprises a camera collecting image data from which a general lane and a center lane are readable.

6. The system of claim 1, wherein the steering controller applies a steering-assistant force when a direction of driver's steering wheel manipulation detected by a steering angle sensor and the avoidance direction are equal to each other, and applies a steering reaction force to restrain the driver's steering wheel manipulation when the direction of the driver's steering wheel manipulation and the avoidance direction are opposite to each other.

7. A method for controlling an inter-vehicle distance, comprising:

determining, by a processor, whether a front end collision of a subject vehicle is avoidable through just brake input from data detected by a first sensor for obtaining information relating to a preceding vehicle during operation of inter-vehicle distance control;

determining, by the processor, an avoidance direction for a lane change of the subject vehicle from data detected by at least one second sensor for obtaining information relating to vehicles in right and left lanes relative to the subject vehicle in response to determining that the front end collision is unavoidable through just brake input; and transmitting, by processor, information relating to the avoidance direction to a steering controller to apply a steering force to a steering device to guide a driver to a lane in the determined avoidance direction.

8. The method of claim 7, wherein the processor determines a crash risk with the preceding vehicle based on the data detected by the first sensor and determines a front end collision avoidance possibility by the driver's brake input from the crash risk.

9. The method of claim 8, wherein the crash risk is defined as a remaining time value until a maximum braking of a subject vehicle regarding a current relative distance and a current relative velocity with respect to a preceding vehicle, and the processor determines a time value corresponding to the current relative distance and the current relative velocity from a table in which time values are defined according to the relative distance and the relative velocity and then, when the determined time value falls within a predetermined reference value, determines that the front collision is unavoidable through just brake input.

10. The method of claim 7, wherein the processor determines a side and rear risk by the vehicles in the right and left lanes based on the data detected by the at least one second sensor, and determines the avoidance direction for the lane change from the side and rear risk.

11. The method of claim 10, wherein the side and rear risk is defined as a remaining time value until a crash with a vehicle in a side lane regarding a current relative distance and a current relative velocity with respect to the vehicles in the right and left lanes, and the processor determines a time value corresponding to the current relative distance and the current relative velocity from a table in which time values are defined according to the relative distance and the relative velocity and then a direction in which the determined time value falls within a predetermined reference value is determined as the avoidance direction.

12. The method of claim 7, wherein the processor warns a driver of a dangerous situation through a warning unit while cancelling control of an inter-vehicle distance controlling operation when it is determined that the front end collision is unavoidable through just brake input, and indicates the avoidance direction to the driver by a directional indicating unit.

13. The method of claim 7, wherein the at least one second sensor comprises a camera collecting image data from which a general lane and a center lane are readable.

14. The method of claim 13, wherein the processor distinguishes between a general lane and a center lane from the image data collected by the at least one second sensor, and excludes a lane direction in which the center lane exists from the avoidance direction.

15. The method of claim 7, wherein the steering controller applies a steering-assistant force when a direction of driver's steering wheel manipulation detected by a steering angle sensor and the avoidance direction are equal to each other, and applies a steering reaction force to restrain the driver's steering wheel manipulation when the direction of the driver's steering wheel manipulation and the avoidance direction are opposite to each other.

16. The method of clam 7, wherein the processor delivers a both-direction risk signal to the steering controller when determining that both directions are dangerous in the determining of the avoidance direction, to apply a steering reaction force in both right and left directions during the driver's steering input to restrain driver's steering wheel manipulation.

17. A non-transitory computer readable medium containing program instructions executed by a processor or controller, the computer readable medium comprising:

program instructions that determine whether a front end collision of a subject vehicle is avoidable through just brake input from data detected by a first sensor for obtaining information relating to a preceding vehicle during operation of inter-vehicle distance control;

program instructions that determine an avoidance direction for a lane change of the subject vehicle from data detected by at least one second sensor for obtaining information relating to vehicles in right and left lanes relative to the subject vehicle in response to determining that the front end collision is unavoidable through just brake input; and program instructions that interpret information relating to the determined avoidance direction and apply a steering force to a steering device to guide a driver to a lane in the determined avoidance direction.

* * * * *